(12) United States Patent
Kim et al.

(10) Patent No.: US 9,653,018 B2
(45) Date of Patent: May 16, 2017

(54) LIGHT-EMITTING DIODE DRIVING DEVICE, DRIVING METHOD AND LIGHT-EMITTING DIODE LIGHTING MODULE COMPRISING THE SAME

(71) Applicant: Seoul Viosys Co., Ltd., Ansan-si (KR)

(72) Inventors: Chang Yeon Kim, Ansan-si (KR); Tae Hyuk Im, Ansan-si (KR); Young Wug Kim, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 10 days.

(21) Appl. No.: 14/715,341

(22) Filed: May 18, 2015

(65) Prior Publication Data

US 2015/0317930 A1 Nov. 5, 2015

Related U.S. Application Data

(63) Continuation of application No. PCT/KR2013/010449, filed on Nov. 18, 2013.

(30) Foreign Application Priority Data

Nov. 16, 2012 (KR) .................. 10-2012-0129954

(51) Int. Cl.
*H05B 37/02* (2006.01)
*G09G 3/32* (2016.01)
*H05B 33/08* (2006.01)

(52) U.S. Cl.
CPC .......... *G09G 3/32* (2013.01); *H05B 33/0815* (2013.01); *Y02B 20/346* (2013.01)

(58) Field of Classification Search
CPC ............ H05B 37/0227; H05B 33/0845; H05B 33/0815; H05B 33/089; H05B 37/00;
(Continued)

(56) References Cited

U.S. PATENT DOCUMENTS

| 2007/0284994 A1* | 12/2007 | Morimoto | C09K 11/0883 |
| | | | 313/483 |
| 2011/0273103 A1* | 11/2011 | Hong | H05B 33/0821 |
| | | | 315/193 |
| 2012/0288974 A1* | 11/2012 | Sharma | H01L 33/20 |
| | | | 438/33 |

FOREIGN PATENT DOCUMENTS

| CN | 101082401 | 12/2007 |
| CN | 101498435 | 8/2009 |

(Continued)

OTHER PUBLICATIONS

International Search Report for International Application No. PCT/KR2013/010449, Feb. 14, 2014, 2 pages.

(Continued)

*Primary Examiner* — Tuyet Vo
*Assistant Examiner* — Amy Yang
(74) *Attorney, Agent, or Firm* — Perkins Coie LLP

(57) ABSTRACT

A light-emitting diode driving device enabling an excellent heat-dissipation function and high-efficient driving is disclosed. The disclosed LED driving device comprises: a power source unit providing an alternate current voltage; a rectification unit communicatively coupled to the power source and rectifying the alternate current voltage; a driving signal generation unit configured to receive the rectified voltage from the rectification unit and generate a primary driving signal by using the rectified voltage; and an LED driving signal modulation unit communicatively coupled to the driving signal generator, the LED driving signal modulation unit configured to receive the primary driving signal and generating a secondary pulse driving signal by modulating the primary driving signal, and LED groups including LEDs and configured to receive the primary driving signal or the second pulse driving signal such that the LED groups (Continued)

operate responsive to the primary driving signal or the secondary pulse driving signal.

25 Claims, 10 Drawing Sheets

(58) Field of Classification Search
CPC ............ H05B 33/0854; H05B 33/0887; H05B 33/0824; H05B 33/0842; H05B 33/0866; G09G 3/32
USPC .............................. 315/185 R, 192, 186, 122
See application file for complete search history.

(56) References Cited

FOREIGN PATENT DOCUMENTS

| KR | 1020070065777 A | 6/2007 |
| KR | 101003071 B1 | 12/2010 |
| KR | 101169738 B | 7/2012 |
| KR | 1020120125142 | 11/2012 |
| KR | 1020120125142 A | 11/2012 |

OTHER PUBLICATIONS

State Intellectual Property Office of China, Chinese Patent Application No. 20138006946961, Office Action, Aug. 2, 2016.

* cited by examiner

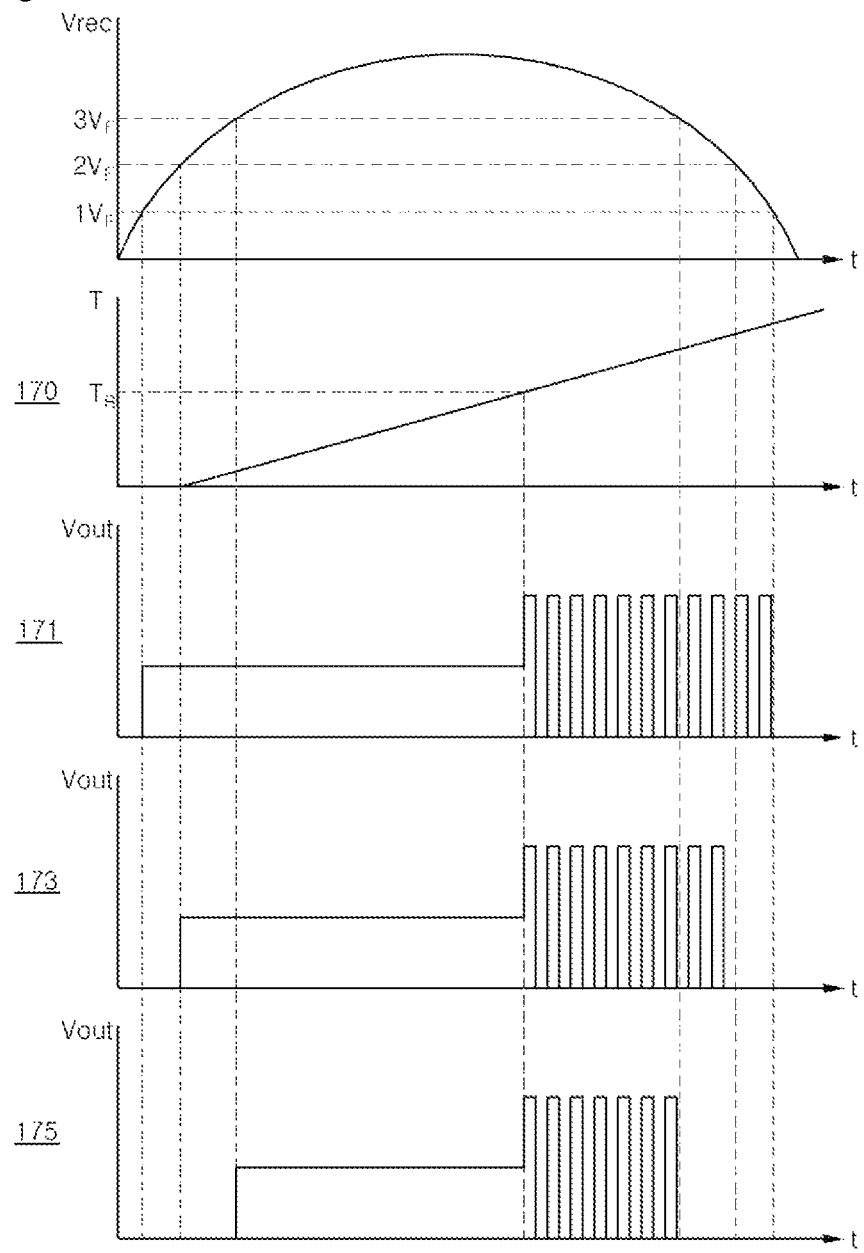

LIGHT-EMITTING DIODE DRIVING DEVICE, DRIVING METHOD AND LIGHT-EMITTING DIODE LIGHTING MODULE COMPRISING THE SAME

PRIORITY CLAIMS AND CROSS-REFERENCE TO RELATED APPLICATION

This patent document is a continuation of, and claims priority and benefits of, a Patent Cooperation Treaty (PCT) application number PCT/KR2013/010449 entitled "LIGHT-EMITTING DIODE DRIVING DEVICE, DRIVING METHOD AND LIGHT-EMITTING DIODE LIGHTING MODULE COMPRISING SAME" and filed with the Korean Intellectual Property Office (KIPO) on Nov. 18, 2013, which further claims priority and the benefits of Korean Patent Application No. 10-2012-0129954 filed on Nov. 16, 2012. The entire disclosures of the above applications are incorporated by reference as part of this document.

TECHNICAL FIELD

This patent document relates to a light emitting diode driving device capable of simultaneously implementing an excellent heat dissipation function and highly efficient operation, a driving method therefor, and a light emitting diode lighting module including the same.

BACKGROUND

Generally, a light emitting diode (LED) is capable of implementing high brightness with low power and is widely used for lighting and the like. The light emitting diode is operated by direct voltage. When an external power source supplies alternating voltage, the alternating voltage is converted into direct voltage to generate driving voltage for driving the light emitting diode.

A general light emitting diode has a structure wherein an N-GaN layer, an active layer and a P-GaN layer are sequentially formed on a sapphire growth substrate, and includes a p-electrode formed on the P-GaN layer, an n-electrode formed on the N-GaN layer, and, optionally, a buffer layer formed between the sapphire growth substrate and the N-GaN layer to relieve lattice mismatch and a difference in coefficients of thermal expansion therebetween.

SUMMARY

Exemplary embodiments of the disclosed technology provide a light emitting diode driving device that has an excellent heat dissipation function by selectively modulating a driving signal for discharge of heat generated by high current driving, a method for driving a light emitting diode, and a light emitting diode lighting module including the same, wherein the light emitting diode employs a gallium nitride substrate or a non-polarizing substrate as a base substrate in order to relieve lattice mismatch and a difference in coefficient of thermal expansion between the base substrate and semiconductor layers and enables high current driving.

Exemplary embodiments of the disclosed technology provide light emitting diode driving devices that guarantee excellent heat dissipation through a modulation of an LED driving signal by sensing rectified voltage or temperature, wherein a light emitting diode enables highly efficient driving through high current driving.

In one aspect, a light emitting diode (LED) driving device includes: a power source supplying alternating current (AC) voltage; a rectification unit communicatively coupled to the power source and rectifying the AC voltage supplied from the power source; a driving signal generator configured to receive the rectified voltage from the rectification unit and generate a primary driving signal using the rectified voltage; and an LED driving signal modulation unit communicatively coupled to the driving signal generator, the LED driving signal modulation unit configured to receive the primary driving signal and generating a secondary pulse driving signal through a modulation of the primary driving signal; and LED groups including LEDs and configured to receive the primary driving signal or the second pulse driving signal such that the LED groups operate responsive to the primary driving signal or the secondary pulse driving signal.

In some implementations, each LED in the LED groups may include a light emitting diode including a growth substrate and a semiconductor layer grown over the growth substrate, and the growth substrate and the semiconductor layer may include a gallium nitride-based semiconductor.

In some implementations, each LED includes a growth substrate and a semiconductor layer grown over the growth substrate, and the semiconductor layer may be grown on a non-polarizing surface of the growth substrate.

In some implementations, the light emitting diode driving device may further include a selector communicatively coupled to the driving signal generator and the LED driving signal modulation unit, the selector configured to receive the primary driving signal and the secondary pulse driving signal and output one of the primary driving signal and the secondary pulse driving signal to the LED groups.

In some implementations, the light emitting diode driving device may further include an LED driving control unit communicatively coupled to the selector and configured to provide a selection signal to control the selector to output one of the primary driving signal and the secondary pulse driving signal based on a voltage level of the rectified voltage.

In some implementations, the selector may output the secondary pulse driving signal to the LED groups when the voltage level of the rectified voltage is higher than or equal to a preset reference value, and may output the primary driving signal to the LED groups when the voltage level of the rectified voltage is less than the preset reference value.

In some implementations, the light emitting diode driving device may further include a temperature sensor that senses temperature of the LED groups and provide a measured temperature value to the LED driving control unit, and the selector may output the secondary pulse driving signal to the LED groups when the measured temperature value is higher than or equal to a reference temperature, and may output the primary driving signal to the LED groups when the measured temperature value is less than the reference temperature.

In some implementations, the secondary pulse driving signal may include a high zone during which the LED groups are turned on, and a low zone during which the LED groups are turned off, and the high zone and the low zone have the same width.

In some implementations, the high zone of the secondary pulse driving signal may have a voltage level two times that of the primary driving signal.

In some implementations, the secondary pulse driving signal may have a driving frequency of 60 Hz or more.

In accordance with another aspect, a light emitting diode (LED) driving device includes: a power source supplying AC voltage; a rectification unit communicatively coupled to the power source, the rectification unit configured to receive the AC voltage from the power source and generate a rectified voltage by rectifying the AC voltage; a plurality of LED driving units configured to receive the rectified voltage from the rectification unit and generate a primary driving signal using the rectified voltage; and a plurality of LED driving signal modulation units communicatively coupled to the plurality of LED driving units, the plurality of LED driving signal modulation units configured to receive the primary driving signal and generate a secondary pulse driving signal through a modulation of the primary driving signal; and LED groups including LEDs and configured to receive the primary driving signal or the secondary pulse driving signal to operate the LEDs according to the received primary driving signal or the secondary pulse driving signal.

In some implementations, the LEDs in the LED groups may include a growth substrate and a semiconductor layer grown on the growth substrate, and the growth substrate and the semiconductor layer may include a gallium nitride-based semiconductor.

In some implementations, of the LEDs in the LED groups may include a growth substrate having a non-polarizing surface and a semiconductor layer grown over the non-polarizing surface of the growth substrate.

In some implementations, the light emitting diode driving device may further include a plurality of selectors communicatively coupled to the LED driving units and the LED driving signal modulation units and configured to output the primary driving signal or the secondary pulse driving signal to the plurality of LED groups.

In some implementations, the light emitting diode driving device may further include an LED driving control unit communicatively coupled to the plurality of selectors and configured to provide selection signals to control the plurality of selectors to output the primary driving signals or the secondary pulse driving signals based on a voltage level of the rectified voltage.

In some implementations, the selectors may output the secondary pulse driving signal to the LED groups when the voltage level of the rectified voltage is higher than or equal to a preset reference value, and may output the primary driving signal to the LED groups when the voltage level of the rectified voltage is less than the preset reference value.

In some implementations, the light emitting diode driving device may further include a temperature sensor that senses temperature of the LED groups and provide a measured temperature value to the LED driving control unit, and the selector may output the secondary pulse driving signal to the LED groups when the measured temperature value is higher than or equal to a reference temperature, and may output the primary driving signal to the LED groups when the measured temperature value is less than the reference temperature.

In some implementations, each of the secondary pulse driving signal may include a high zone during which the LED groups are turned on and a low zone during which the LED groups are turned off, and the high zone and the low zone have the same width.

In some implementations, the high zone of the secondary pulse driving signal may have a voltage level two times that of the primary driving signal.

In some implementations, the secondary pulse driving signal may have a driving frequency of 60 Hz or more.

In another aspect, a method for driving a light emitting diode is provided. The method may include: supplying AC voltage; rectifying the supplied AC voltage; generating a primary driving signal using the rectified voltage; generating a secondary pulse driving signal through a modulation of the primary driving signal; and supplying the primary driving signal or the secondary pulse driving signal to a plurality of LED groups.

In some implementations, the LED groups may include a light emitting diode including a growth substrate and a semiconductor layer grown over the growth substrate; the growth substrate and the semiconductor layer may include a gallium nitride-based semiconductor; and the semiconductor layer may be grown on a non-polarizing surface of the growth substrate.

In some implementations, the method may further include, after the generating the secondary pulse driving signal and before the supplying the primary driving signal or the secondary pulse driving signal, providing a selection signal selecting one of the primary driving signal and the secondary pulse driving signal.

In some implementations, wherein the providing of the selection signal includes comparing the rectified signal with a preset reference value such that the selection signal selects one of the primary driving signal and the secondary pulse driving signal based on the comparison result.

In some implementations, the selecting one of the primary driving signal and the secondary pulse driving signal may include outputting the secondary pulse driving signal to the LED groups when a voltage level of the rectified voltage is higher than or equal to a preset reference value, and outputting the primary driving signal to the LED groups when the voltage level of the rectified voltage is less than the present reference value.

In some implementations, the method may further include sensing temperature of the LED groups, wherein the secondary pulse driving signal may be output to the LED groups when a measured temperature is higher than or equal to a reference temperature, and the primary driving signal may be output to the LED groups when the measured temperature is less than the reference temperature.

In some implementations, the secondary pulse driving signal may include a high zone during which the LED groups are turned on and a low zone during which the LED groups are turned off, and the high zone and the low zone have the same width.

In some implementations, the high zone of the secondary pulse driving signal may have a voltage level two times that of the primary driving signal.

In another aspect, a light emitting diode lighting module is provided to include an LED group comprising at least one light emitting diode; a power source supplying AC voltage; a rectification unit communicatively coupled to the power source, the rectification unit configured to rectify the AC voltage supplied from the power source and provide a rectified voltage; a driving signal generator communicatively coupled to the rectification unit, the driving signal generator configured to generate a primary driving signal having a constant current value of 1 A or more using the rectified voltage; an LED driving signal modulation unit communicatively coupled to the driving signal generator, the LED driving signal modulation unit configured to generate a secondary pulse driving signal through a modulation of the primary driving signal; and a driving signal supplier communicatively coupled to the LED group and supplying the secondary pulse driving signal at a peak current density of 70 A/cm² or more to the LED group when a separate driving control signal is not applied.

According to some embodiments of the disclosed technology, a light emitting diode employs a gallium nitride substrate as a base substrate and thus can realize highly efficient driving through high current driving while securing an excellent heat dissipation function.

According to some embodiments of the disclosed technology, an LED driving device includes LED groups, each of which includes a light emitting diode employing a gallium nitride substrate as a base substrate and allowing high current driving, and can selectively supply a primary driving signal or a secondary pulse driving signal to the LED groups with reference to a voltage level of a rectified voltage or temperature in order to implement an excellent heat dissipation function and highly efficient driving at the same time.

Further, the LED driving device includes a plurality of LED groups, each of which includes a light emitting diode employing a gallium nitride substrate as a base substrate, and adopts an AC voltage sequential driving manner in which the plurality of LED groups are sequentially driven such that a primary driving signal or a secondary pulse driving signal can be selectively supplied to the LED groups with reference to a voltage level of a rectified voltage or temperature in order to implement an excellent heat dissipation function and highly efficient driving at the same time.

BRIEF DESCRIPTION OF DRAWINGS

FIG. 10 is a graph depicting exemplary waveforms of a primary driving signal and a secondary pulse driving signal of the LED driving device according to the fourth embodiment of the disclosed technology.

DETAILED DESCRIPTION

Figure 1:
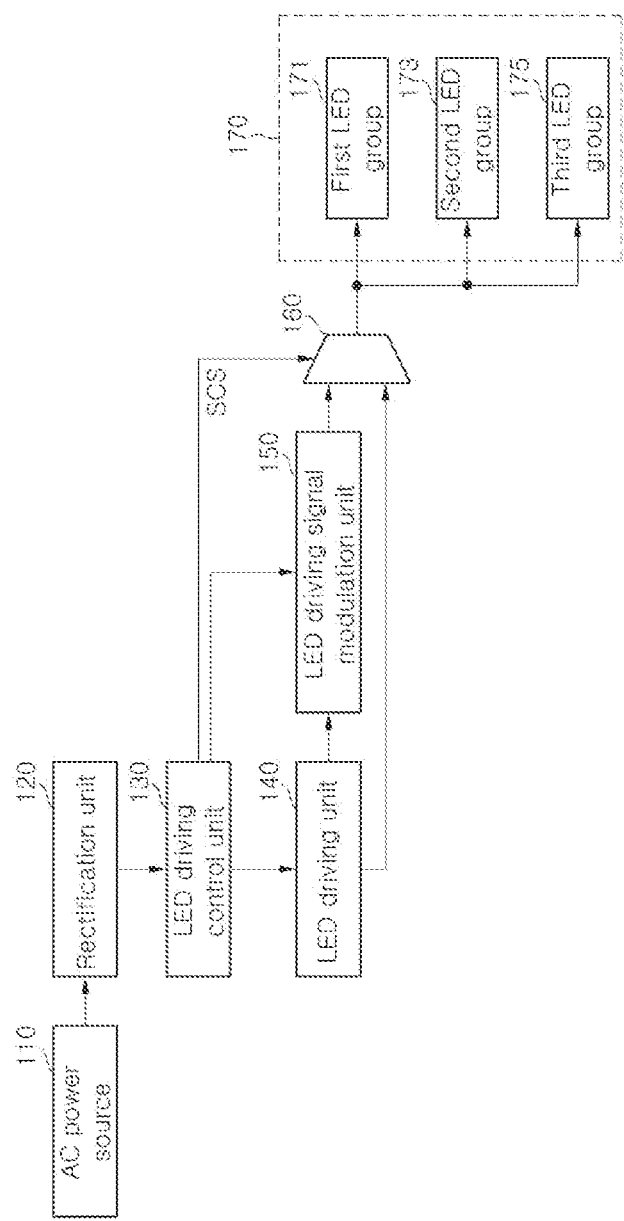
FIG. 1 is a block diagram of an exemplary LED driving device according to a first embodiment of the disclosed technology.

A light emitting diode can have a structure employing a gallium nitride growth substrate as a base substrate in order to realize high efficiency by relieving lattice mismatch and a difference in coefficient of thermal expansion between the sapphire growth substrate and semiconductor layers while enhancing electrical characteristics.

A conventional light emitting diode formed on a sapphire growth substrate suffers from a droop phenomenon when the intensity of light is decreased even with increase of driving current. A light emitting diode formed on a gallium nitride growth substrate suffers less reduction in intensity of light caused by the droop phenomenon even when applying a driving current of several hundred milliampere (mA) and thus provides high brightness when applying high driving current. When the N-GaN layer, the active layer, and the P-GaN layer of the light emitting diode are grown on an m-plane or an a-plane, which corresponds to a non-polar plane, it is possible to suppress reduction in intensity of light as compared with c-plane growth.

As such, the light emitting diode using the gallium nitride growth substrate or the light emitting diode having semiconductor layers (including N-GaN layer, active layer and P-GaN layer) grown on a non-polarizing plane has an advantage of high brightness at high driving current as compared with conventional light emitting diodes in the related art, but has a problem of severe heat generation due to high current driving. The disclosed technology provides for a method and apparatus for driving a light emitting diode in order to overcome the problem of heat generation due to high current driving.

Hereinafter, various embodiments of the disclosed technology will be described in more detail with reference to the accompanying drawings. The following embodiments are provided by way of example so as to facilitate understanding various implementations of the disclosed technology. Accordingly, the disclosed technology is not limited to the embodiments disclosed herein and may also be implemented in different forms. In the drawings, widths, lengths, thicknesses, and the like of elements may be exaggerated for clarity and descriptive purposes. Throughout the specification, like reference numerals denote like elements having the same or similar functions. Now, exemplary embodiments of the invention will be described in detail with reference to the accompanying drawings.

FIG. 1 is a diagram of an exemplary LED driving device according to a first embodiment of the disclosed technology.

Referring to FIG. 1, the LED driving device according to the first embodiment includes an AC power source 110 supplying AC voltage; a rectification unit 120 rectifying the AC voltage supplied from the AC power source; a plurality of LED groups 170; an LED driving unit 140 generating a primary driving signal for driving the plurality of LED groups 170 using the rectified voltage from the rectification unit 120; and an LED driving control unit 130 controlling the LED driving unit 140.

The LED driving device according to this embodiment of the disclosed technology further includes an LED driving signal modulation unit 150 that generates a secondary pulse driving signal through modulation of the primary driving signal supplied from the LED driving unit 140, and a selector 160 that outputs one of the primary driving signal and the secondary pulse driving signal.

The LED groups 170 include first to third LED groups 171, 173 and 175, each of which is defined by LEDs connected to each other in series, in parallel, or in combination of serial and parallel connections. Although the LED groups 170 include three LED groups 171, 173 and 175 in the first embodiment of the disclosed technology, it should be understood that other implementations are also possible. For example, in some implementations, the LED driving device may include one or two LED groups or four or more LED groups.

Each of the LED groups 170 may include a light emitting diode, which includes a growth substrate and a semiconductor layer grown on the growth substrate, wherein the growth substrate and the semiconductor layer may include a gallium nitride-based semiconductor.

Each of the LED groups 170 may include a light emitting diode, which includes a growth substrate and a semiconductor layer grown on the growth substrate, wherein the semiconductor layer may be grown on a non-polarizing surface of the growth substrate.

Here, the LED groups 170 include light emitting diodes that employ a gallium nitride substrate as a base substrate and are capable of driving at high current.

The rectification unit 120 generates a rectified voltage through rectification of AC voltage input from the AC power source 110. The rectification unit 120 may employ a rectification circuit, such as a full-wave rectification circuit, or a half-wave rectification circuit, and the like. The rectified voltage is provided to the LED driving control unit 130, the LED driving unit 140, and the LED groups 170.

The LED driving control unit 130 determines, based on the magnitude of the rectified voltage provided from the rectification unit 120, the magnitude of the primary driving signal to be supplied to the LED groups 170, and timing of supplying and interrupting the primary driving signal. In addition, the LED driving control unit 130 compares the magnitude of the rectified voltage with a preset reference voltage and generates a selection control signal SCS for controlling the selector 160 based on a comparison result.

The reference voltage corresponds to a critical value, at which heat generation of the LED groups 170 is started, among voltage levels of the rectified voltage. Thus, the reference voltage may be used as a criterion for determining whether heat is generated from the LED groups 170.

The LED driving signal modulation unit 150 has a function of converting the primary driving signal of the LED driving unit 140 into the secondary pulse driving signal.

The secondary pulse driving signal has a driving frequency of 60 Hz or more such that a flickering phenomenon caused by the repetition of on or off of the LED groups 170 is invisible to the naked eye.

The secondary pulse driving signal is controlled to have a pulse magnitude in proportion to the voltage level of the primary driving signal. Here, the primary driving signal may include a constant voltage signal, a constant current signal, or a constant voltage-constant current signal.

The LED driving signal modulation unit 150 generates a pulse signal having a positive value. That is, the LED driving signal modulation unit 150 generates the secondary pulse driving signal that has a high zone of a positive value.

More specifically, the secondary pulse driving signal has a high zone and a low zone. The high zone and the low zone have the same width, and the high zone of the secondary pulse driving signal has a voltage level two times that of the primary driving signal. Further, the low zone of the secondary pulse driving signal may be defined as a time zone in which current supply to the LED group 170 is blocked.

Thus, according to this embodiment, the LED driving device can suppress heat generation by stopping operation of the LED groups 170 using the low zone of the secondary pulse driving signal having the same width as that of the high zone. Further, the pulse magnitude of the high zone of the secondary pulse driving signal is controlled depending upon the voltage level of the primary driving signal, whereby the magnitude of driving voltage or driving current to be supplied to the LED groups 170 can be controlled.

The selector 160 has a multiplexer (MUX) function that outputs one of the primary driving signal and the secondary pulse driving signal after receiving the primary driving signal and the secondary pulse driving signal.

Although not shown in the drawings, the selector 160 includes a plurality of switching devices and outputs the primary driving signal or the secondary pulse driving signal to the LED groups 170 by the switching devices controlled in response to the selection control signal (SCS) from the LED driving control unit 130.

As such, the LED driving device according to the first embodiment determines the magnitude of the input rectified voltage and selectively supplies the primary driving signal having a direct current form or the secondary pulse driving signal having a pulse form, thereby advantageously enhancing heat dissipation of the LED groups 170.

Figure 2:
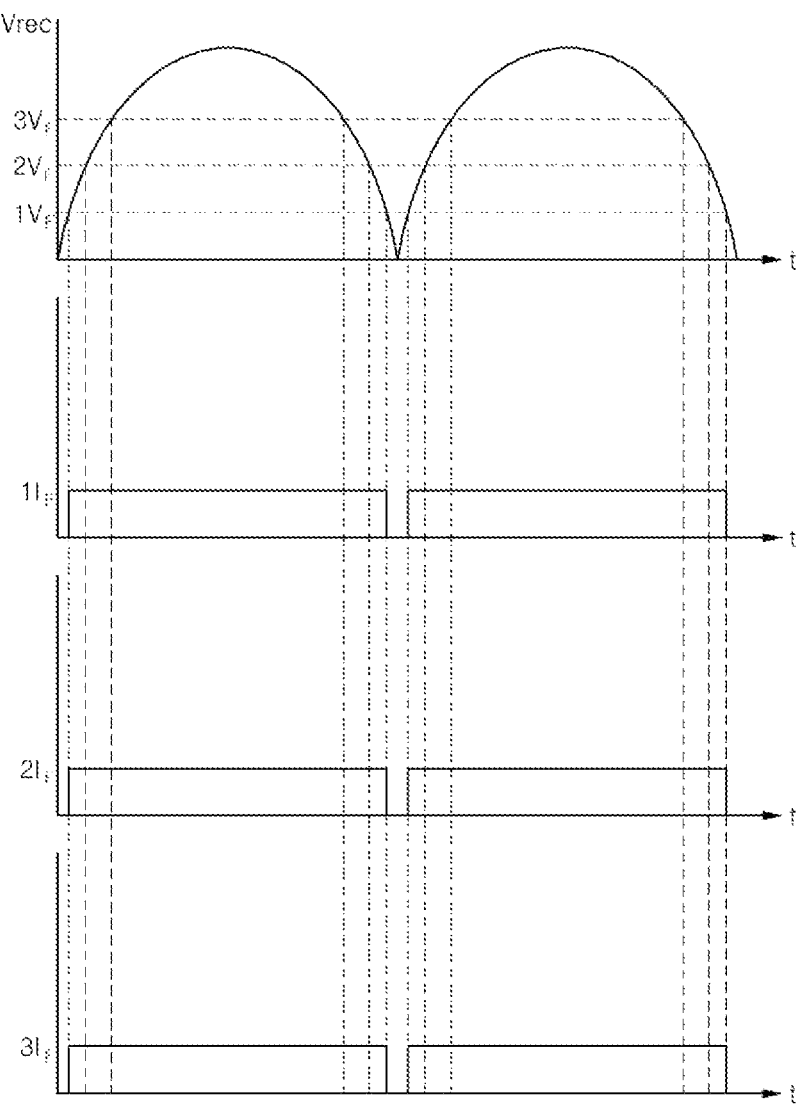
FIG. 2 is a graph depicting exemplary waveforms of rectified voltage and constant current of the LED driving device according to the first embodiment of the disclosed technology.
Figure 3:
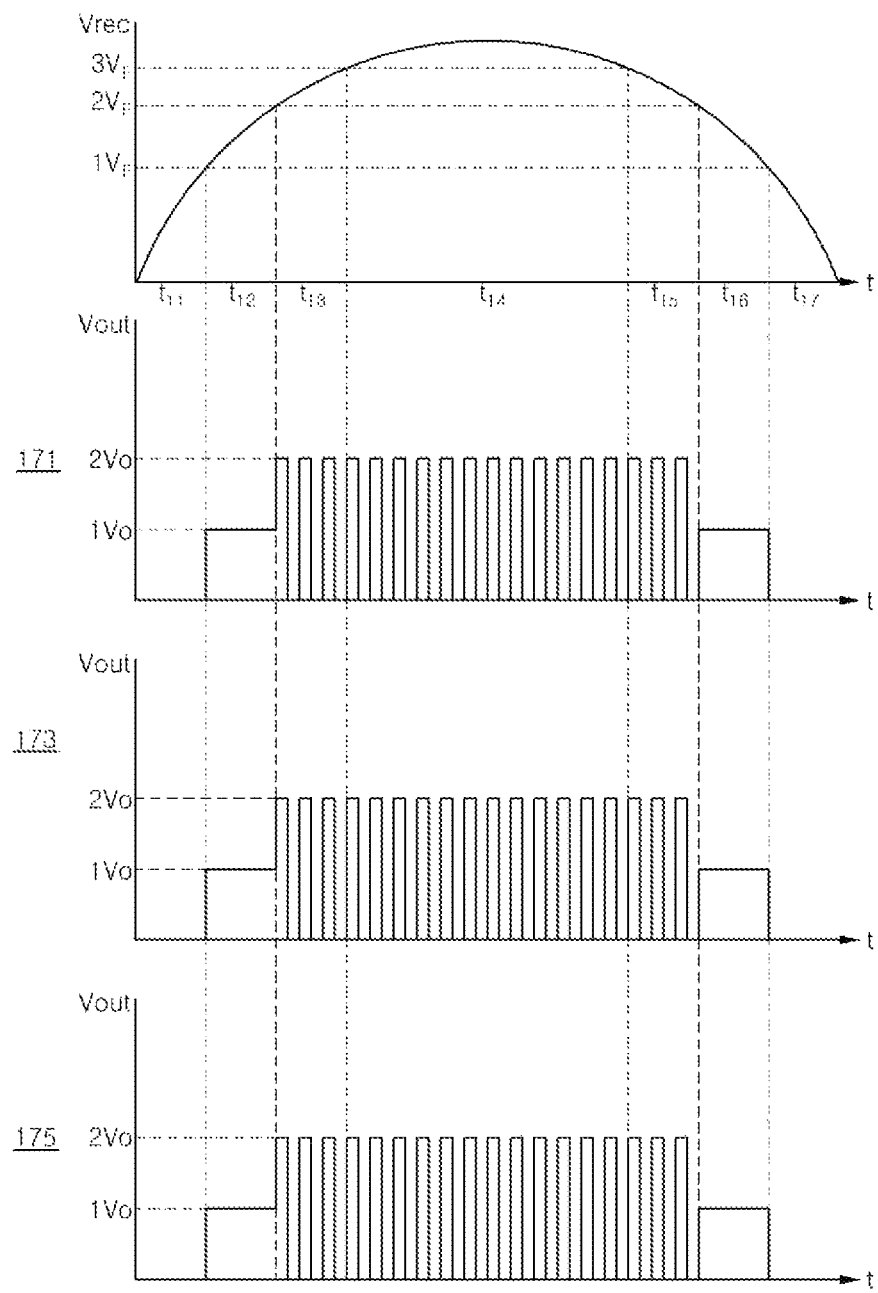
FIG. 3 is a graph depicting exemplary waveforms of a primary driving signal and a secondary pulse driving signal of the LED driving device according to the first embodiment of the disclosed technology.

FIG. 2 is a graph depicting waveforms of rectified voltage and constant current of the LED driving device according to the first embodiment of the disclosed technology, and FIG. 3 is a graph depicting waveforms of a primary driving signal and a secondary pulse driving signal of the LED driving device according to the first embodiment of the disclosed technology.

Referring to FIGS. 1 and 2, the first to third LED groups 171, 173 and 175 included in the LED groups 170 are driven during the same time zone. For example, the first to third LED groups 171, 173 and 175 may be turned on or off at the same time.

In some implementations of the disclosed technology, the rectified voltage Vrec varies over time between 0 to Vrec max.

The LED driving device allows the first to third LED groups 171, 173 and 175 to be driven when the rectified voltage Vrec is higher than or equal to a critical voltage for driving the LED groups 170 (that is, when a voltage level of the rectified voltage Vrec is higher than or equal to a first forward voltage level, $1V_F$ ($1V_F \leq Vrec$)).

In addition, the LED driving device stops operation of the first to third LED groups 171, 173 and 175, when the rectified voltage Vrec is less than the critical voltage (that is, when the voltage level of the rectified voltage Vrec is less than the first forward voltage level ($1V_F > Vrec$)).

It can be seen that the first to third LED groups 171, 173 and 175 are simultaneously driven or stopped over time with reference to first to third driving current waveforms 1IF, 2IF, 3IF.

Referring to FIGS. 1 and 3, according to the first embodiment, during first zones t12 and t16 the primary driving signal having a direct current form is supplied to the first to third LED groups 171, 173 and 175. The first zones t12 and t16 correspond to the periods of which the rectified voltage Vrec is more than or equal to the first forward voltage level $1V_F$ and less than the second forward voltage level $2V_F$.

During a second zone t13 or t15, a modulated LED pulse signal having a pulse form is supplied to the first to third LED groups 171, 173 and 175. The second zones correspond to the period of which the rectified voltage Vrec is more than or equal to the second forward voltage level $2V_F$ and less than the third forward voltage level $3V_F$. According to the first embodiment, the LED driving control unit 130 controls operation of the first to third LED groups 171, 173 and 175 according to a reference voltage that is preset to allow the modulated LED pulse signal to be supplied to the first to third LED groups 171, 173 and 175 during the second and third zones t13, t14 and t15 of which the rectified voltage Vrec is more than or equal to the second forward voltage level (2 $V_F \leq VP \leq Vrec$ max). That is, the reference voltage may correspond to the voltage level at which the rectified voltage Vrec becomes the second forward voltage level $2V_F$.

According to the first embodiment, each of the first to third LED groups 171, 173 and 175 includes high current driving light emitting diodes using a gallium nitride substrate as a base substrate, and the first to third LED groups 171, 173 and 175 are repeatedly turned on or off in response to the secondary pulse driving signal having a high zone and a low zone during the second and third zones t13, t14 and t15 of the second and third forward voltage levels ($2V_F \leq VP \leq Vrec$ max), thereby implementing an excellent heat dissipation function and highly efficient driving.

Figure 4:
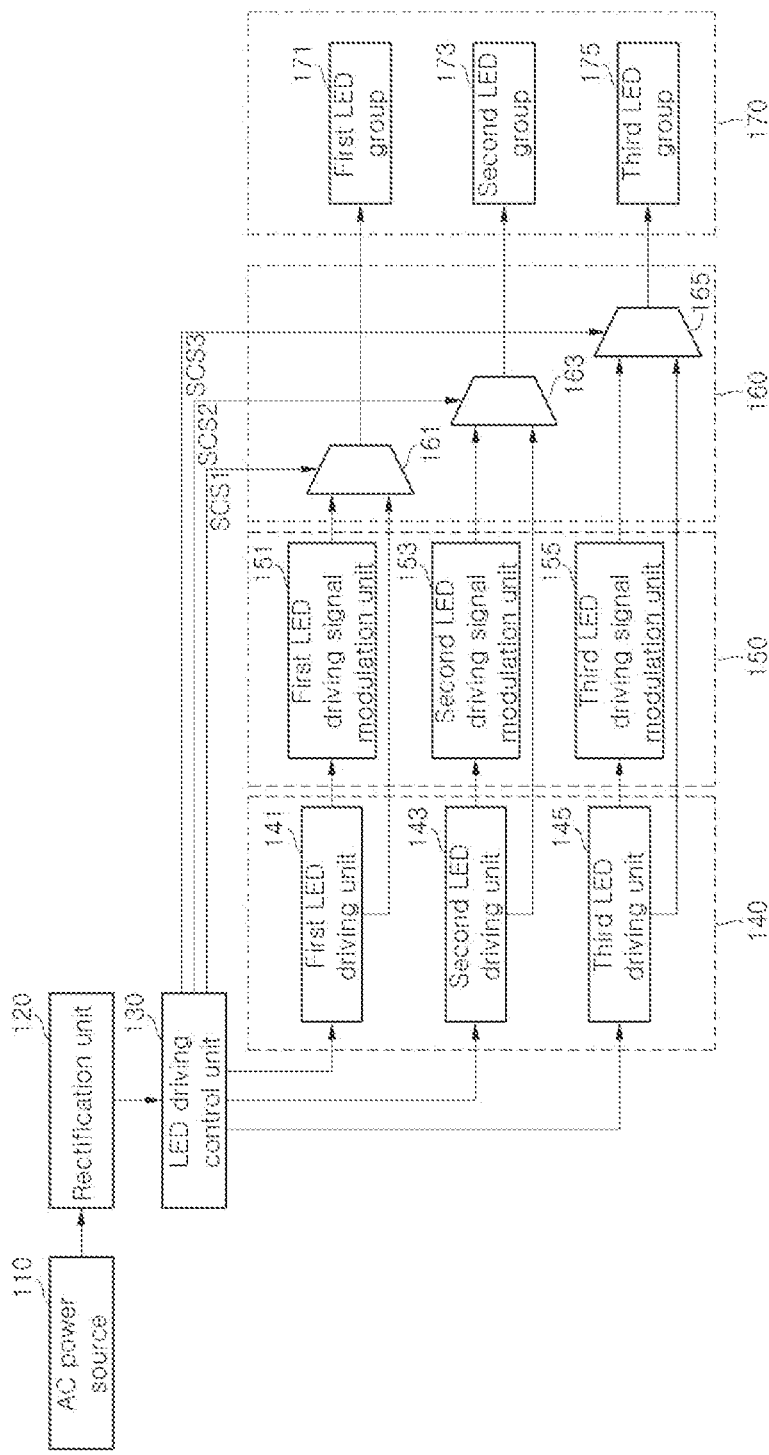
FIG. 4 is a block diagram of an exemplary LED driving device according to a second embodiment of the disclosed technology.

FIG. 4 is a block diagram of an exemplary LED driving device according to a second embodiment of the disclosed technology.

As shown in FIG. 4, the LED driving device according to the second embodiment includes an AC power source 110 supplying AC voltage; a rectification unit 120 rectifying the AC voltage supplied from the AC power source; a plurality of LED groups 170; a plurality of LED driving units 140 individually driving the plurality of LED groups 170 using the rectified voltage supplied from the rectification unit 120; and an LED driving control unit 130 controlling the plurality of LED driving units 140.

The LED driving device according to this embodiment further includes a plurality of LED driving signal modulation units 150 each generating a secondary pulse driving signal through modulation of the primary driving signal supplied from the corresponding LED driving unit 140, and a plurality of selectors 160 each outputting the primary driving signal or the secondary pulse driving signal.

The LED groups 170 include first to third LED groups 171, 173 and 175, each of which is defined by light emitting diodes connected to each other in series, in parallel, or in combination of serial and parallel connections. Although the LED groups 170 include three LED groups 171, 173 and 175 in the second embodiment, it should be understood that other implementations are also possible. For example, in some implementations, the LED driving device may include one or two LED groups or four or more LED groups.

Here, each of the LED groups 170 includes light emitting diodes that employ a gallium nitride substrate as a base substrate and are capable of driving at high current.

The rectification unit 120 generates a rectified voltage through rectification of AC voltage input from the AC power source 110. The rectification unit 120 may employ any rectification circuit, such as a full-wave rectification circuit, or a half-wave rectification circuit, and the like. The rectified voltage is provided to the LED driving control unit 130, the plurality of LED driving units 140, and the plurality of LED groups 170.

The plurality of LED driving units 140 includes first to third LED driving units 141, 143 and 145, each generating a primary driving signal for individually driving the first to third LED groups 171, 173 and 175.

In the LED driving device according to the second embodiment, the plurality of LED driving units 141, 143 and 145 individually drive the first to third LED groups 171, 173 and 175 of the plurality of LED groups 170, and adopt an AC voltage sequential driving manner in which the first to third LED groups 171, 173 and 175 are sequentially driven depending upon a voltage level of the rectified voltage.

Figure 5:
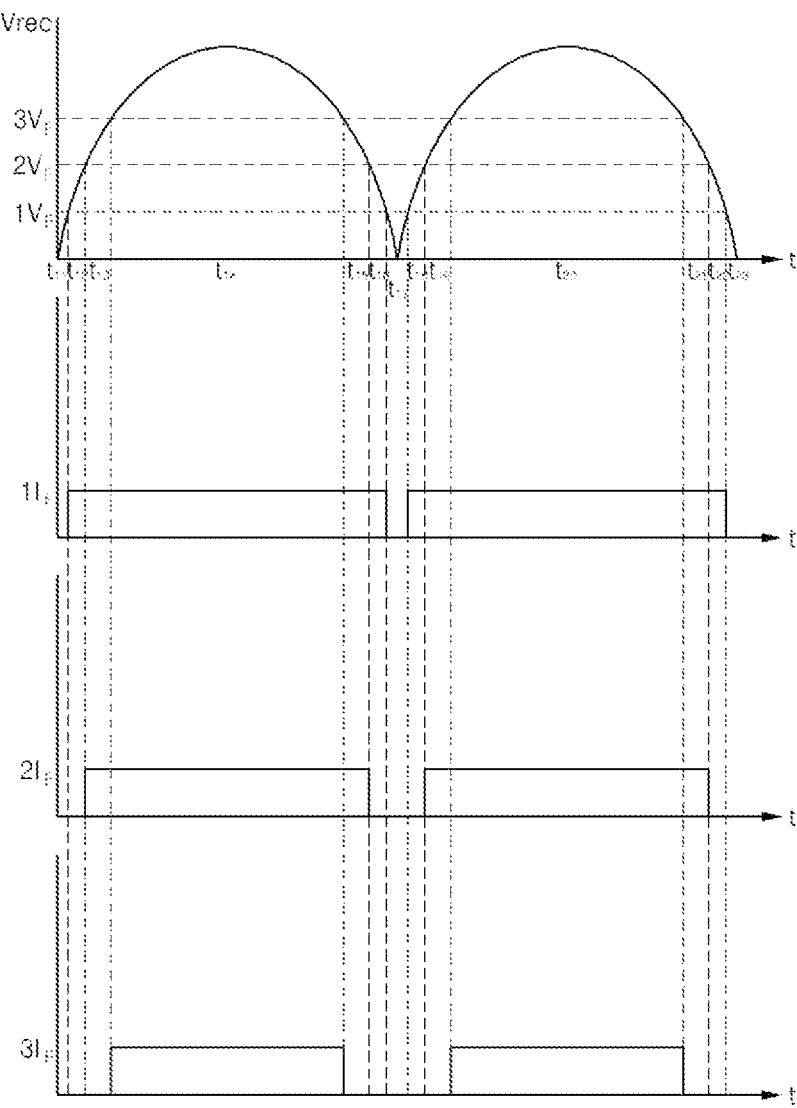
FIG. 5 is a graph depicting exemplary waveforms of rectified voltage and constant current of the LED driving device according to the second embodiment of the disclosed technology.

Referring to FIGS. 4 and 5, the voltage level of the rectified voltage Vrec varies over time.

The LED driving control unit 130 determines the magnitude of the rectified voltage and controls the plurality of LED driving units 140 such that the primary driving signal can be supplied to the first LED group 171 only, when the voltage level of the rectified voltage Vrec satisfies $1V_F \leq Vrec < 2V_F$. At this time, the second and third LED groups 173 and 175 are kept in a driving stop state.

When the voltage level of the rectified voltage Vrec satisfies $2V_F \leq Vrec < 3V_F$), the LED driving control unit 130 controls the plurality of LED driving units 140 such that the primary driving signal can be supplied to the first and second LED groups 171 and 173 only. At this time, the third LED group 175 is kept in a driving stop state.

When the voltage level of the rectified voltage Vrec satisfies $3V_F \leq Vrec \leq Vrec$ max), the LED driving control unit 130 controls the plurality of LED driving units 140 such that the primary driving signal can be supplied to the first to third LED groups 171, 173 and 175.

As such, the first forward voltage level. $1V_F$ means a critical voltage level capable of driving a single LED group, the second forward voltage level $2V_F$ means a critical voltage level capable of driving two LED groups, and the third forward voltage level $3V_F$ means a critical voltage level capable of driving three LED groups. That is, the $n^{th}$ forward voltage level $nV_F$ means a critical voltage level capable of driving n LED groups.

The LED driving control unit 130 compares the magnitude of the rectified voltage Vrec with a preset reference voltage and generates a plurality of selection control signals SCS1, SCS2 and SCS3 for controlling the plurality of selectors 160 based on a comparison result.

The reference voltage corresponds to a critical value, at which heat generation of the LED groups 170 is started, among voltage levels of the rectified voltage Vrec. Thus, the reference voltage may be used as a criterion for determining whether heat is generated from the LED groups 170.

The plurality of LED driving signal modulation units 150 are connected to the plurality of LED driving units 140 in one-to-one correspondence, and have a function of converting the primary driving signal sent from the plurality of LED driving units 140 into the secondary pulse driving signal. That is, the plurality of LED driving signal modulation units 150 include first to third LED driving signal modulation units 151, 153 and 155, which may be connected to the first to third LED driving units 141, 143 and 145 in one-to-one correspondence.

The secondary pulse driving signal has a driving frequency of 60 Hz or more such that a flickering phenomenon resulting from the repetition of on or off of the LED groups 170 is invisible to the naked eye.

The secondary pulse driving signal is controlled to have a pulse magnitude in proportion to the voltage level of the primary driving signal. Here, the primary driving signal may include a constant voltage signal, a constant current signal, or a constant voltage-constant current signal.

The plural LED driving signal modulation units 150 generate a pulse signal having a positive value. That is, the plural LED driving signal modulation units 150 generate the secondary pulse driving signal that has a high zone of a positive value.

More specifically, the secondary pulse driving signal has a high zone and a low zone. The high zone and the low zone have the same width, and the high zone of the secondary pulse driving signal has a voltage level two times that of the primary driving signal. Further, the low zone of the secondary pulse driving signal may be defined as a time zone in which current supply to the LED group 170 is blocked.

Thus, according to this embodiment, the LED driving device can suppress heat generation by stopping operation of the LED groups 170 using the low zone of the secondary pulse driving signal having the same width as that of the high zone. Further, the pulse magnitude of the high zone of the secondary pulse driving signal is controlled depending upon the voltage level of the primary driving signal, whereby the magnitude of driving voltage or driving current to be supplied to the LED groups 170 can be controlled Each of the selectors 160 has a multiplexer (MUX) function that outputs one of the primary driving signal and the secondary pulse driving signal after receiving the primary driving signal and the secondary pulse driving signal.

Although not shown in the drawings, the plurality of selectors 160 includes first to third selectors 161, 163 and 165, each of which includes a plurality of switching devices (not shown). The plurality of selectors 160 are individually controlled by the selection control signals SCS1, SCS2 and SCS3 from the LED driving control unit 130 and output the primary driving signal or the secondary pulse driving signal to the first to third LED groups 171, 173 and 175 by the switching devices.

As such, the LED driving device according to the second embodiment adopts an AC voltage sequential driving manner in which the first to third LED groups 171, 173 and 175 are sequentially driven depending upon the voltage level of the rectified voltage Vrec, and determines the magnitude of the rectified voltage Vrec and selectively supplies the primary driving signal having a direct current form or the secondary pulse driving signal having a pulse form, thereby advantageously enhancing heat dissipation of the LED groups 170.

Figure 6:
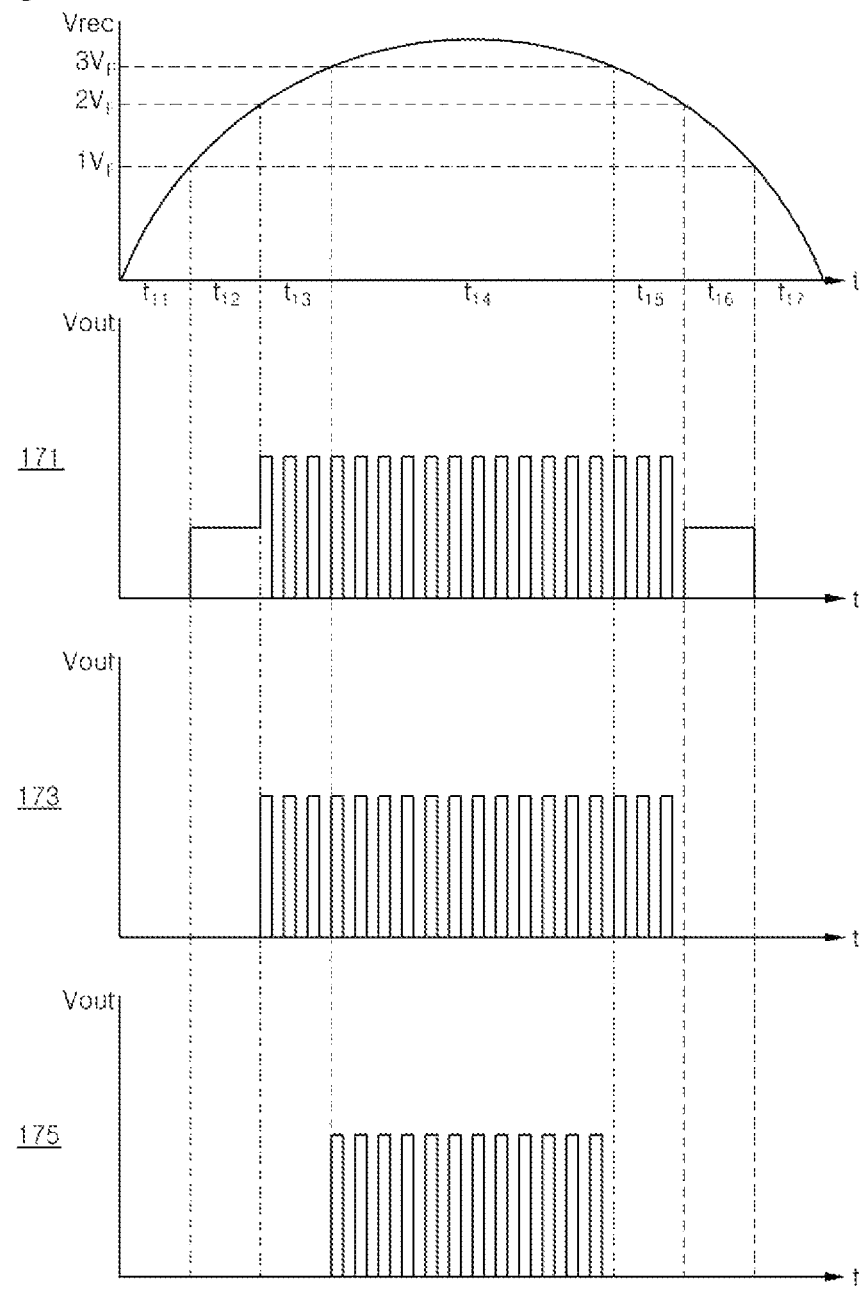
FIG. 6 is a graph depicting exemplary waveforms of a primary driving signal and a secondary pulse driving signal of the LED driving device according to the second embodiment of the disclosed technology.

FIG. 5 is a graph depicting waveforms of rectified voltage and constant current of the LED driving device according to the second embodiment of the disclosed technology, and FIG. 6 is a graph depicting waveforms of a primary driving signal and a secondary pulse driving signal of the LED driving device according to the second embodiment of the disclosed technology.

Referring to FIGS. 4 and 5, the first to third LED groups 171, 173 and 175 included in the LED groups 170 are sequentially driven according to the voltage level of the rectified voltage Vrec.

In some implementations of the disclosed technology, the rectified voltage Vrec varies over time between 0 to Vrec.

The LED driving device allows the first LED group 171 only to be driven when the rectified voltage Vrec is higher than or equal to the first forward voltage level ($1V_F \le Vrec < 2V_F$) capable of driving the LED groups; allows the first and second LED groups 171 and 173 to be driven when the voltage level of the rectified voltage Vrec satisfies $2V_F \le Vrec < 3V_F$); and allows all of the first to third LED groups 171, 173 and 175 to be driven when the voltage level of the rectified voltage Vrec satisfies $3V_F \le Vrec \le Vrec$ max).

Further, the LED driving device stop operation of all of the first to third LED groups 171, 173 and 175, when the rectified voltage Vrec is less than the critical voltage (that is, when the voltage level of the rectified voltage Vrec is less than the first forward voltage level ($1V_F > VP$)).

It can be seen that all of the first to third LED groups 171, 173 and 175 are sequentially driven according to the voltage level of the rectified voltage Vrec that varies over time.

Referring to FIGS. 4 and 6, according to the second embodiment of the disclosed technology, during first zones t12 and t16, the primary driving signal having a direct current form is supplied to the first LED group 171. The first zones t12 and t16 correspond to the periods of which the rectified voltage Vrec is more than or equal to the first forward voltage level $1V_F$ and less than the second forward voltage level $2V_F$.

During a second zone t13 or t15, a modulated LED pulse signal having a pulse form is supplied to the first to third LED groups 171, 173 and 175. The second zones correspond to the period of which the rectified voltage Vrec is more than or equal to the second forward voltage level $2V_F$ and less than the third forward voltage level $3V_F$. According to the second embodiment, the LED driving control unit 130 controls operation of the first to third LED groups 171, 173 and 175 according to a reference voltage that is preset to allow the modulated LED pulse signal to be supplied to the first to third LED groups 171, 173 and 175 during the second and third zones t13, t14 and t15 of which the rectified voltage Vrec is more than or equal to the second forward voltage level $2V_F$. That is, the reference voltage may correspond the voltage level at which the rectified voltage Vrec becomes the second forward voltage level $2V_F$. Although the reference value of this implementation is described to the voltage level in which the rectified voltage Vrec becomes the second forward voltage level $2V_F$, it should be understood that other implementations are also possible. For example, the reference value can be changed according to characteristics of the light emitting diodes (for example, time point at which heat generation is started).

According to the second embodiment, each of the LED groups 170 includes high current driving light emitting diodes using a gallium nitride substrate as a base substrate and is repeatedly turned on or off in response to the secondary pulse driving signal having a high zone and a low zone during the second and third zones t13, t14 and t15 of the second and third forward voltage levels $2V_F$, $3V_F$, thereby implementing an excellent heat dissipation function and highly efficient driving.

Figure 7:
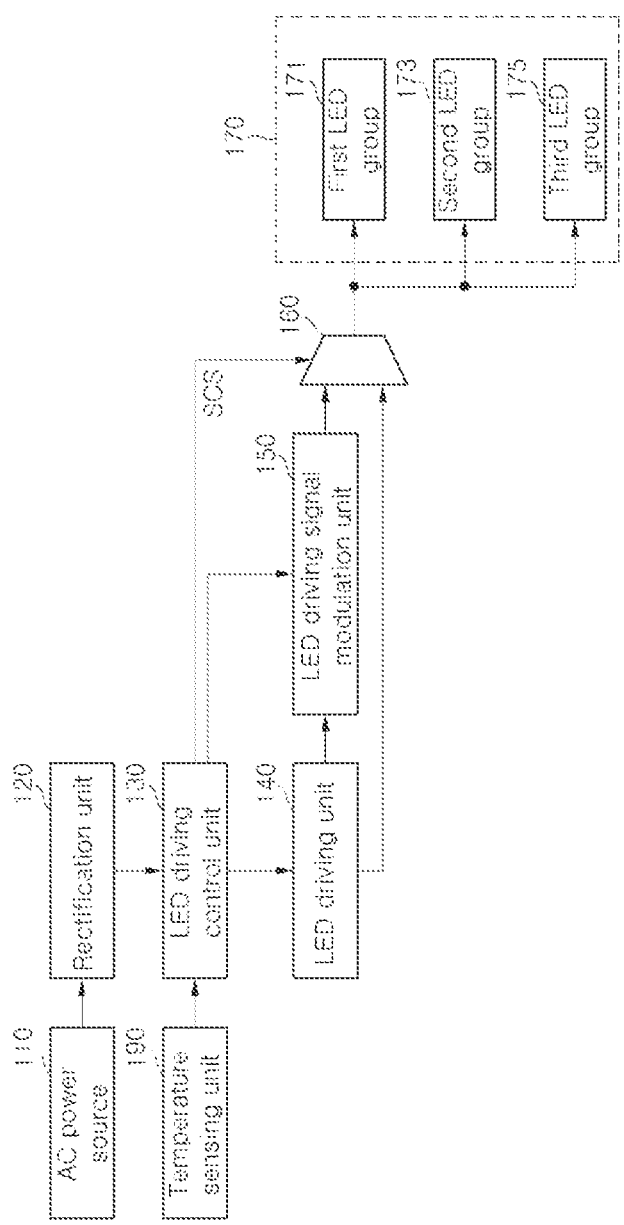
FIG. 7 is a block diagram of an exemplary LED driving device according to a third embodiment of the disclosed technology.
Figure 8:
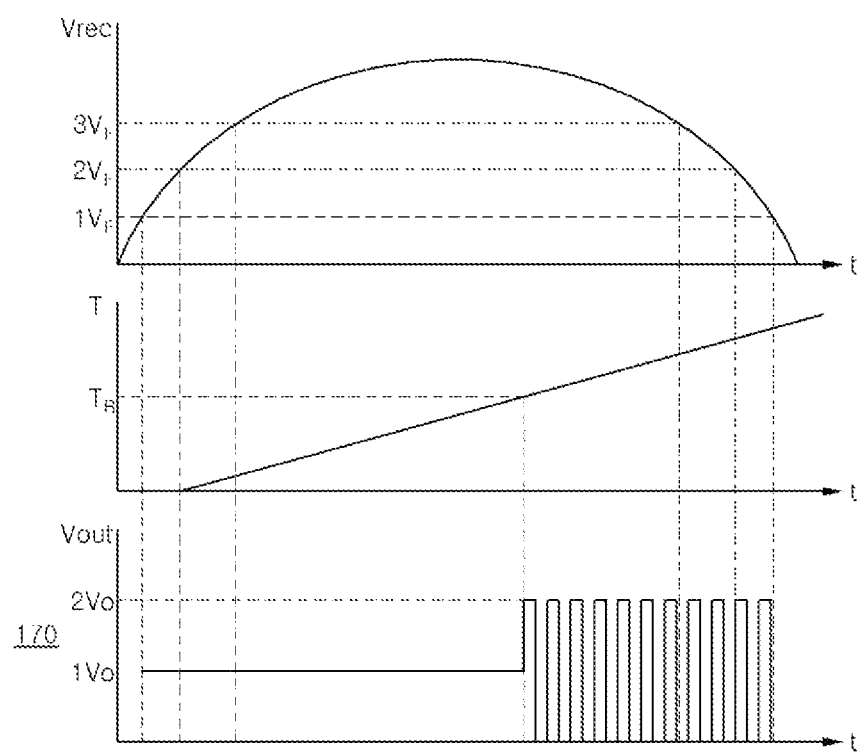
FIG. 8 is a graph depicting exemplary waveforms of rectified voltage and constant current of the LED driving device according to the third embodiment of the disclosed technology.

FIG. 7 is a block diagram of an exemplary LED driving device according to a third embodiment of the disclosed technology and FIG. 8 is a graph depicting waveforms of the rectified voltage and constant current of the LED driving device according to the third embodiment of the disclosed technology.

The LED driving device as shown in FIG. 7 according to the third embodiment include same components as shown in the first embodiment as shown in FIG. 1 and further includes a temperature sensing unit 190. For ease of understanding, the same components of the LED driving device according to the third embodiment have been denoted by the same reference numerals as those of the LED driving device according to the first embodiment, and detailed descriptions thereof are omitted.

The LED driving device according to the third embodiment further includes a temperature sensing unit 190 configured to sense the temperature of the LED groups 170.

The temperature sensing unit 190 may include a temperature resistor capable of sensing the temperature of the LED groups 170. Although not specifically shown in the drawings, the temperature resistor of the temperature sensing unit 190 may be connected to a feedback signal line of the LED groups 170.

The temperature sensing unit 190 supplies sensed temperature data to the LED driving control unit 130.

The LED driving control unit 130 compares the temperature data supplied from the temperature sensing unit 190 with a reference value and generates a selection control signal SCS for controlling the selector 160 based on a comparison result.

The reference value may correspond to a critical temperature TR at which heat generation of the LED groups 170 is started.

When the temperature data is higher than or equal to the reference value, the selector 160 outputs the secondary pulse driving signal to the LED groups 170 in response to the selection control signal SCS from the LED driving control unit 130.

The secondary pulse driving signal has a high zone and a low zone. The high zone and the low zone have the same width, and the high zone of the secondary pulse driving signal has a voltage level two times that of the primary driving signal. Further, the low zone of the secondary pulse driving signal may be defined as a time zone in which current supply to the LED groups 170 is blocked.

Thus, according to the third embodiment, the LED driving device can suppress heat generation through the repetition of on or off of the LED groups 170 using the secondary pulse driving signal according to temperature change of the LED groups 170. Further, according to some implementations of the disclosed technology, the pulse magnitude of the high zone of the secondary pulse driving signal is controlled depending upon the voltage level of the rectified voltage Vrec, whereby the magnitude of driving voltage or driving current to be supplied to the LED groups 170 can be controlled, thereby implementing high efficiency while securing an excellent heat dissipation function.

Figure 9:
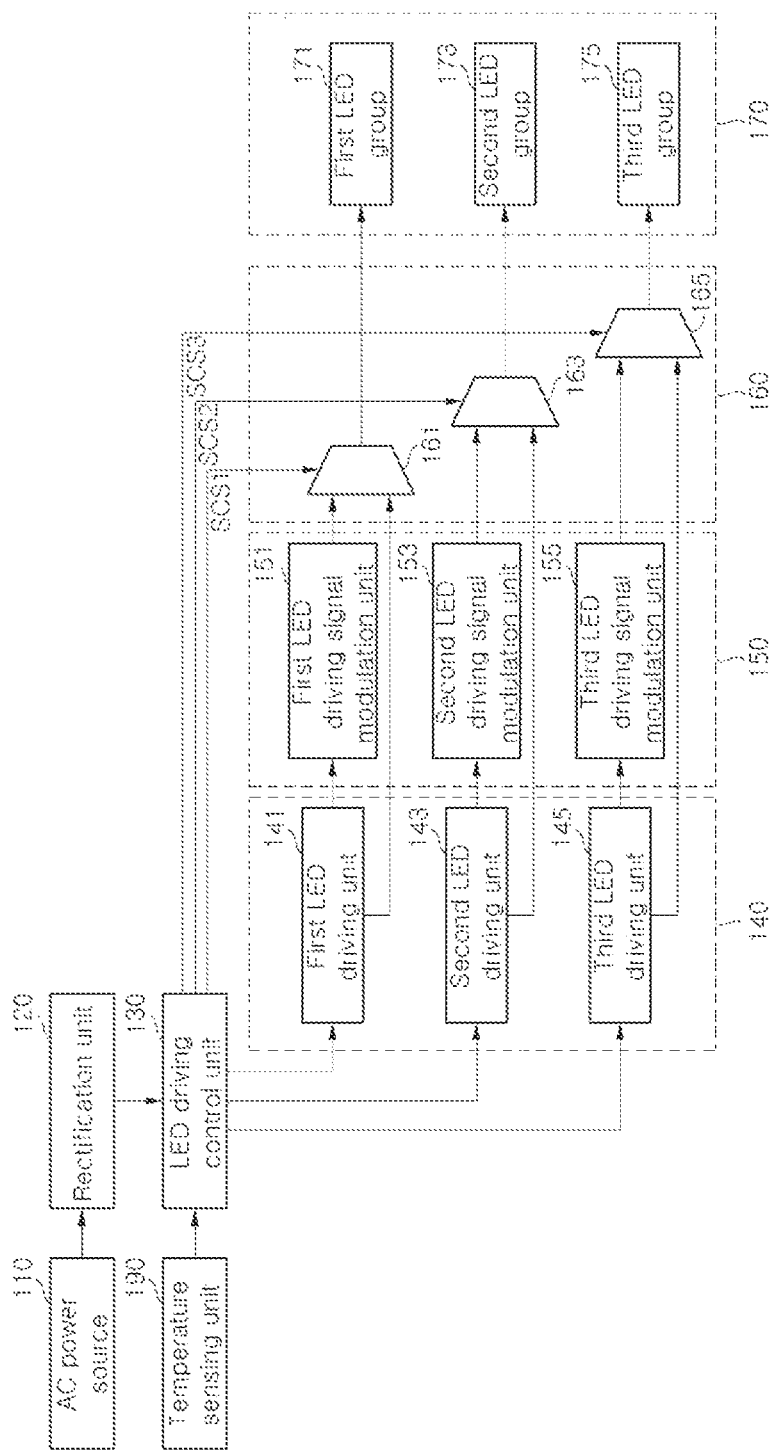
FIG. 9 is a block diagram of an exemplary LED driving device according to a fourth embodiment of the disclosed technology.

FIG. 9 is a block diagram of an exemplary LED driving device according to a fourth embodiment of the disclosed technology, and FIG. 10 is a graph depicting exemplary waveforms of a primary driving signal and a secondary pulse driving signal of the LED driving device according to the fourth embodiment of the disclosed technology.

The LED driving device as shown in FIG. 9 according to the fourth embodiment include same components as shown in the second embodiment as shown in FIG. 1 and further includes a temperature sensing unit 190. For ease of understanding, the same components of the LED driving device according to the fourth embodiment have been denoted by the same reference numerals as those of the LED driving device according to the second embodiment, and detailed descriptions thereof are omitted.

The LED driving device according to the fourth embodiment further includes a temperature sensing unit 190 configured to sense the temperature of the LED groups 170.

The temperature sensing unit 190 may include a temperature resistor capable of sensing the temperature of the LED groups 170. Although not specifically shown in the drawings, the temperature resistor of the temperature sensing unit 190 may be connected to a feedback signal line of the LED groups 170

The temperature sensing unit 190 supplies sensed temperature data to the LED driving control unit 130.

The LED driving control unit 130 compares the temperature data supplied from the temperature sensing unit 190 with a reference value and generates first to third selection control signals SCS1, SCS2 and SCS3 for individually controlling the first to third selectors 161, 163 and 165 based on a comparison result.

The reference value may correspond to a critical temperature TR at which heat generation of the LED groups 170 is started.

When the temperature data is higher than or equal to the reference value, the first to third selectors 161, 163 and 165 output the secondary pulse driving signal to the LED groups 170 in response to the selection control signals SCS1, SCS2 and SCS3 supplied from the LED driving control unit 130.

The secondary pulse driving signal has a high zone and a low zone. The high zone and the low zone have the same width, and the high zone of the secondary pulse driving signal has a voltage level two times that of the primary driving signal. Further, the low zone of the secondary pulse driving signal may be defined as a time zone in which current supply to the LED groups 170 is blocked Thus, according to the fourth embodiment, the LED driving device adopts an AC voltage sequential driving manner in which the first to third LED groups 171, 173 and 175 are sequentially driven depending upon a voltage level of the rectified voltage Vrec, and can suppress heat generation through the repetition of on or off of the LED groups 170 using the secondary pulse driving signal according to temperature change of the LED groups 170. Further, according to some implementations of the disclosed technology, the pulse magnitude of the high zone of the secondary pulse driving signal is controlled depending upon the voltage level of the rectified voltage Vrec, whereby the magnitude of driving voltage or driving current to be supplied to the LED groups 170 can be controlled, thereby implementing high efficiency while securing an excellent heat dissipation function.

The first to fourth embodiments provide the LED driving devices capable of implementing highly efficient operation and heat dissipation through simultaneous driving or sequential driving of LED groups depending upon the voltage level of the rectified voltage or temperature of the LED groups. The LED driving devices can be configured in more various manners, for example, by further including an LED lighting module.

In some implementations, the LED lighting module may include an LED group; a driving signal generator generating a primary driving signal having a current value of 1 A or more using a rectified voltage; an LED driving signal modulation unit generating a secondary pulse driving signal through modulation of the primary driving signal; and a driving signal supplier supplying the secondary pulse driving signal at a peak current density of 70 A/cm$^2$ or more to the LED group when a separate driving control signal is not applied.

Although various embodiments and features of the disclosed technology have been described above, it should be understood that various modifications, changes, and alterations can be made without departing from the scope of the present invention.

The invention claimed is:

1. A light emitting diode (LED) driving device comprising:
   a power source supplying alternating current (AC) voltage;
   a rectification unit communicatively coupled to the power source and rectifying the AC voltage supplied from the power source;
   a driving signal generator configured to receive the rectified voltage from the rectification unit and generate a primary driving signal using the rectified voltage;
   an LED driving signal modulation unit communicatively coupled to the driving signal generator, the LED driving signal modulation unit configured to receive the primary driving signal and generating a secondary pulse driving signal through a modulation of the primary driving signal;
a plurality of LED groups including LEDs and configured to receive the primary driving signal or the second pulse driving signal such that the LED groups operate responsive to the primary driving signal or the secondary pulse driving signal; and
a selector communicatively coupled to the driving signal generator and the LED driving signal modulation unit, the selector configured to receive the primary driving signal and the secondary pulse driving signal and output only one of the primary driving signal and the secondary pulse driving signal to the LED groups, wherein at least one LED group from the plurality of LED groups is configured to repeatedly turn on and turn off in responsive to transitions of the secondary pulse driving signal between a low level and a high level.

2. The light emitting diode driving device according to claim 1, wherein each LED in the LED groups includes a growth substrate and a semiconductor layer grown over the growth substrate, the growth substrate and the semiconductor layer comprising a gallium nitride-based semiconductor.

3. The light emitting diode driving device according to claim 1, wherein each LED includes a growth substrate having a non-polarizing surface and a semiconductor layer grown over the non-polarizing surface of the growth substrate.

4. The light emitting diode driving device according to claim 1, further comprising:
an LED driving control unit communicatively coupled to the selector and configured to provide a selection signal to control the selector to output one of the primary driving signal and the secondary pulse driving signal based on a voltage level of the rectified voltage.

5. The light emitting diode driving device according to claim 4, further comprising:
a temperature sensor that senses temperature of the LED groups and provides a measured temperature value to the LED driving control unit,
wherein the selector outputs the secondary pulse driving signal to the LED groups when the measured temperature value is higher than or equal to a reference temperature, and outputs the primary driving signal to the LED groups when the measured temperature value is less than the reference temperature.

6. The light emitting diode driving device according to claim 1, wherein the selector outputs the secondary pulse driving signal to the LED groups when the voltage level of the rectified voltage is higher than or equal to a preset reference value, and outputs the primary driving signal to the LED groups when the voltage level of the rectified voltage is less than the preset reference value.

7. The light emitting diode driving device according to claim 1, wherein the secondary pulse driving signal comprises a high zone during which the LED groups are turned on, and a low zone during which the LED groups are turned off, the high zone and the low zone having the same width.

8. The light emitting diode driving device according to claim 7, wherein the high zone of the secondary pulse driving signal have a voltage level two times that of the primary driving signal.

9. The light emitting diode driving device according to claim 1, wherein the secondary pulse driving signal has a driving frequency of 60 Hz or more.

10. A light emitting diode (LED) driving device comprising:
a power source supplying AC voltage;
a rectification unit communicatively coupled to the power source, the rectification unit configured to receive the AC voltage from the power source and generate a rectified voltage by rectifying the AC voltage;
a plurality of LED driving units configured to receive the rectified voltage from the rectification unit and generate a primary driving signal using the rectified voltage;
a plurality of LED driving signal modulation units communicatively coupled to the plurality of LED driving units, the plurality of LED driving signal modulation units configured to receive the primary driving signal and generate a secondary pulse driving signal through a modulation of the primary driving signal;
LED groups including LEDs and configured to receive the primary driving signal or the secondary pulse driving signal to operate the LEDs according to the received primary driving signal or the secondary pulse driving signal; and
a plurality of selectors communicatively coupled to the LED driving units and the LED driving signal modulation units and configured to output only one of the primary driving signal or the secondary pulse driving signal to the plurality of LED groups, wherein at least one LED group from the plurality of LED groups is configured to repeatedly turn on and turn off in responsive to transitions of the secondary pulse driving signal between a low level and a high level.

11. The light emitting diode driving device according to claim 10, wherein the LEDs in the LED groups include a growth substrate and a semiconductor layer grown over the growth substrate, the growth substrate and the semiconductor layer comprising a gallium nitride-based semiconductor.

12. The light emitting diode driving device according to claim 10, wherein the LEDs in the LED groups include a growth substrate having a non-polarizing surface and a semiconductor layer grown over the non-polarizing surface of the growth substrate.

13. The light emitting diode driving device according to claim 10, further comprising:
an LED driving control unit communicatively coupled to the plurality of selectors and configured to provide selection signals to control the plurality of selectors to output the primary driving signals or the secondary pulse driving signals based on a voltage level of the rectified voltage.

14. The light emitting diode driving device according to claim 13, further comprising:
a temperature sensor that senses temperature of the LED groups and provides a measured temperature value to the LED driving control unit,
wherein the selectors output the secondary pulse driving signal to the LED groups when the measured temperature value is higher than or equal to a reference temperature, and output the primary driving signal to the LED groups when the measured temperature value is less than the reference temperature.

15. The light emitting diode driving device according to claim 10, wherein the selectors output the secondary pulse driving signal to the LED groups when the voltage level of the rectified voltage is higher than or equal to a preset reference value, and output the primary driving signal to the LED groups when the voltage level of the rectified voltage is less than the preset reference value.

16. The light emitting diode driving device according to claim 10, wherein each of the secondary pulse driving signal comprises a high zone during which the LED group is turned on, and a low zone during which the LED group is turned off, the high zone and the low zone having the same width.

17. The light emitting diode driving device according to claim 16, wherein the high zone of the secondary pulse driving signal has a voltage level two times that of the primary driving signal.

18. The light emitting diode driving device according to claim 10, wherein the secondary pulse driving signal has a driving frequency of 60 Hz or more.

19. A method for driving a light emitting diode, comprising:
 supplying AC voltage;
 rectifying the supplied AC voltage;
 generating a primary driving signal using the rectified voltage;
 generating a secondary pulse driving signal through a modulation of the primary driving signal;
 supplying the primary driving signal or the secondary pulse driving signal to a plurality of LED groups; and
 after the generating the secondary pulse driving signal and before the supplying the primary driving signal or the secondary pulse driving signal, providing a selection signal selecting only one of the primary driving signal and the secondary pulse driving signal, wherein at least one LED group from the plurality of LED groups is configured to repeatedly turn on and turn off in responsive to transitions of the secondary pulse driving signal between a low level and a high level.

20. The method according to claim 19, wherein the LED groups comprises a light emitting diode including a growth substrate and a semiconductor layer grown over the growth substrate, the growth substrate and the semiconductor layer comprising a gallium nitride-based semiconductor, and the semiconductor layer being grown on a non-polarizing surface of the growth substrate.

21. The method according to claim 19, wherein the providing of the selection signal includes comparing the rectified signal with a preset reference value such that the selection signal selects one of the primary driving signal and the secondary pulse driving signal based on the comparison result.

22. The method according to claim 19, wherein the selecting one of the primary driving signal and the secondary pulse driving signal comprises outputting the secondary pulse driving signal to the LED groups when a voltage level of the rectified voltage is higher than or equal to a preset reference value, and outputting the primary driving signal to the LED groups when the voltage level of the rectified voltage is less than the present reference value.

23. The method for driving a light emitting diode according to claim 19, further comprising:
 sensing temperature of the LED groups,
 wherein the secondary pulse driving signal is output to the LED groups when a measured temperature is higher than or equal to a reference temperature, and the primary driving signal is output to the LED groups when the measured temperature is less than the reference temperature.

24. The method for driving a light emitting diode according to claim 19, wherein the secondary pulse driving signal comprises a high zone during which the LED group is turned on, and a low zone during which the LED group is turned off, the high zone and the low zone having the same width.

25. The method for driving a light emitting diode according to claim 24, wherein the high zone of the secondary pulse driving signal has a voltage level two times that of the primary driving signal.

* * * * *